(12) United States Patent
Kostadinov

(10) Patent No.: US 8,161,200 B2
(45) Date of Patent: Apr. 17, 2012

(54) MULTI-PROTOCOL BUS DEVICE

(75) Inventor: Vladimir Kostadinov, Sharon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 78 days.

(21) Appl. No.: 12/267,710

(22) Filed: Nov. 10, 2008

(65) Prior Publication Data

US 2009/0070504 A1    Mar. 12, 2009

Related U.S. Application Data

(62) Division of application No. 11/349,911, filed on Feb. 9, 2006, now Pat. No. 7,451,244, which is a division of application No. 09/954,220, filed on Sep. 18, 2001, now Pat. No. 7,032,045.

(51) Int. Cl.
*G06F 3/00* (2006.01)

(52) U.S. Cl. .................. 710/11; 710/16; 710/63

(58) Field of Classification Search .......... 710/11, 710/15, 16, 63, 64, 72, 104, 105; 709/220, 709/230
See application file for complete search history.

(56) References Cited

U.S. PATENT DOCUMENTS

| | | | | |
|---|---|---|---|---|
| 4,339,819 | A | * | 7/1982 | Jacobson ............... 714/734 |
| 4,500,933 | A | * | 2/1985 | Chan ................... 360/69 |
| 4,803,485 | A | | 2/1989 | Rypinski |
| 5,270,917 | A | | 12/1993 | Kimura |
| 5,525,959 | A | * | 6/1996 | Przybyla et al. ........... 340/438 |
| 5,613,096 | A | | 3/1997 | Danknick |
| 5,691,984 | A | | 11/1997 | Gardner et al. |
| 5,699,532 | A | | 12/1997 | Barrett et al. |
| 5,832,423 | A | | 11/1998 | Hochart |
| 5,842,039 | A | | 11/1998 | Hanaway et al. |
| 5,903,455 | A | | 5/1999 | Sharpe, Jr. et al. |
| 6,038,400 | A | | 3/2000 | Bell et al. |
| 6,072,803 | A | | 6/2000 | Allmond et al. |
| 6,138,180 | A | | 10/2000 | Zegelin |
| 6,226,702 | B1 | | 5/2001 | Yakashiro |
| 6,243,776 | B1 | | 6/2001 | Lattimore et al. |

(Continued)

FOREIGN PATENT DOCUMENTS

EP    0 713 310 A2    5/1996

(Continued)

OTHER PUBLICATIONS

Definition of "Code" by Wikipedia, <http://en.wikipedia.org/wiki/Code>, accessed on Aug. 16, 2010.*

(Continued)

*Primary Examiner* — Khanh Dang

(74) *Attorney, Agent, or Firm* — Edward S. Jarmolowicz, Esq.

(57) ABSTRACT

In one general aspect, methods and devices for use with multiple communications protocols automatically determine which communications protocol to use when connected to a system bus. Signals transmitted on the system bus are monitored to determine what communications protocol the system bus is using. After determining which communications protocol the system is using, a compatible communications protocol is selected from one of several communications protocols stored in a device's memory. As a result, a user may connect a device to the system bus without having to determine which communications protocol is used by the system bus. Furthermore, suppliers may stock a single type of device that is compatible with multiple communications protocols reducing overhead associated with stocking devices. In addition, a device may be switched between systems without regard to the communications protocol of the device or system.

16 Claims, 9 Drawing Sheets

U.S. PATENT DOCUMENTS

| | | |
|---|---|---|
| 6,285,966 B1 | 9/2001 | Brown et al. |
| 6,330,628 B1 | 12/2001 | Motoyama |
| 6,445,716 B1 | 9/2002 | Favichia et al. |
| 6,484,216 B1 | 11/2002 | Zegelin |
| 6,539,267 B1 * | 3/2003 | Eryurek et al. ............... 700/51 |
| 6,553,336 B1 | 4/2003 | Johnson et al. |
| 6,581,127 B1 * | 6/2003 | Hou et al. .................. 710/305 |
| 6,678,751 B1 | 1/2004 | Hays et al. |
| 6,721,819 B2 | 4/2004 | Estakhri et al. |
| 6,741,606 B1 * | 5/2004 | Mori ........................ 370/463 |
| 6,742,071 B1 | 5/2004 | Boynton et al. |
| 6,823,283 B2 | 11/2004 | Steger et al. |
| 6,895,447 B2 * | 5/2005 | Brewer et al. ................ 710/11 |
| 6,904,476 B2 | 6/2005 | Hedtke |
| 6,917,594 B2 | 7/2005 | Feuerstraeter et al. |
| 7,249,213 B2 | 7/2007 | Feng et al. |
| 7,318,112 B2 * | 1/2008 | Park ............................ 710/36 |
| 7,496,671 B2 * | 2/2009 | Engel et al. ................. 709/230 |
| 2002/0105968 A1 | 8/2002 | Pruzan et al. |
| 2003/0014579 A1 | 1/2003 | Heigl et al. |

FOREIGN PATENT DOCUMENTS

| | | |
|---|---|---|
| EP | 0 906 595 | 11/2001 |
| EP | 1 006 691 | 4/2005 |
| WO | WO 98/53581 | 11/1998 |
| WO | WO 99/20075 | 4/1999 |
| WO | WO 03/039098 | 5/2003 |

OTHER PUBLICATIONS

Richard V. Baxter, Jr., Implementing Open Networking in a Motor Drive, Oct. 1, 1999, Pensar Corporation, San Jose, CA.

Ethernet Trumps Buses, Jul. 2000, IvTech, ISA Publication.

"Gigabit Speed Multi-Protocol Chip and Adapters for Network Computing" XP-00739405; IBM Technical Disclosure Bulletin; vol. 40, No. 10; Oct. 1997; pp. 13-15.

"CAN Baudrate Detection with Infineon CAN devices"; Tobias Wenzel, Microcontroller Application Engineering; XP-002201996; Microntrollers ApNote—AP2925; Microcontroller Division; Jul. 1999, Rev. 1.0; pp. 1-11.

"A tale of three buses: DeviceNet, Profibus-DP, Foundation Fieldbus"; Mike Santori, National Instruments, XP-000767352; (PCT 230) 2119 EDN—Electrical Design News; 42 Oct. 23, 1997, No. 22, Newton, MA, US; pp. 149-160.

"Prozessor integriert; Profibus-DP-Controller mit 8031-Core" Albert Tretter; XP-000862478; BNSDOCID:<XP- 862478A- 1; Elektronik 22/1998; pp. 88-90.

Search Report dated Nov. 27, 2002 from PCT/US02/29082.

* cited by examiner

MULTI-PROTOCOL BUS DEVICE

CROSS REFERENCE TO RELATED APPLICATIONS

This application is a divisional (and claims the benefit of priority under 35 U.S.C. § 121) of U.S. application Ser. No. 11/349,911, filed Feb. 9, 2006, now allowed, which is a divisional of U.S. Application Ser. No. 09/954,220, filed Sep. 18, 2001, now U.S. Pat. No. 7,032,045. The disclosures of the prior applications are considered part of (and are incorporated by reference in) the disclosure of this application.

TECHNICAL FIELD

This invention relates generally to system buses and in particular to multi-protocol devices for use on system buses.

BACKGROUND

Advances in technology have made automation and process control practical for many different applications. In particular, many factories and production facilities have been partially or completely automated. A number of devices, such as, for example, sensors, actuators, and controllers may be located throughout a facility, for example, to monitor and control the facility's automated process.

The sensor, actuator, and controller may be connected to a system bus. The system bus is a two-way, digital communications medium that connects the devices to a master unit. The master unit may supervise or control the devices connected to the system bus. In addition, one or more workstations may be connected to the system bus that allow operators to monitor and control the automated process using the master unit.

The master unit may include a communication interface that operates according to a specific communications protocol. All signals transmitted on the system bus are encoded according to the communications protocol specification. Each device connected to the system bus must be compatible with the communications protocol to receive commands from and to exchange data with the master unit. Therefore, only devices that have been preprogrammed to use the communications protocol may be connected with the system. As a result, for each type of device that may be used with a system, the supplier must stock devices that are compatible with each communications protocol that the supplier services. This leads to increased overhead associated with servicing more than one communications protocol. In addition, devices from a system using one communications protocol are not interchangeable with a system using another communications protocol.

SUMMARY

In one general aspect, devices including industrial control devices for use with multiple communications protocols automatically determine which communications protocol to use when connected to a system bus. Signals transmitted on the system bus are monitored to determine what communications protocol the system bus is using, and a compatible communications protocol is selected from one of several communications protocols stored in a device's memory. As a result, a user may connect a device to the system bus without having to determine which communications protocol is used by the system bus. In addition, a supplier may stock a single type of device that is compatible with multiple communications protocols, which reduces overhead associated with stocking devices. A user, who may be unsure whether one communication protocol is better than another, are not forced to decide prematurely which communications protocol to use based on the device they purchase. In addition, the user may switch to another protocol at a later time without having to switch devices. A device also may be switched between systems without regard to the communications protocol of the device or the systems.

In another general aspect, a signal transmitted on a bus is received, and a determination is made as whether the signal is specific to a communications protocol. The communications protocol corresponding to the specific signal is selected, and signals are processed according to the selected communications protocol. A content and a length of the received signal may be determined, and the signal may be determined to be specific to the communications protocol if the signal content in combination with the signal length is specific to the communications protocol.

The signal content and an associated signal length may be stored with an indication of a communications protocol corresponding to the stored signal content and the associated signal length. The signal may be determined as specific by determining that the signal content and the signal length match the stored content and the associated length.

A multi-protocol bus device may include a bus interface operable to receive a signal and a processor operable to determine that the signal is specific to a communications s protocol. In addition, the processor may select the communications protocol that corresponds to the specific signal. Signals may be processed according to the selected communications protocol. The processor may determine the signal is specific by determining a content of the signal and a length of the signal. The processor may determine that the signal is specific to the communications protocol if the signal content in combination with the signal length is specific to the communications protocol.

The device may include a memory to store a signal content and associated signal length. In addition, the memory may store an indication of a communications protocol that corresponds to the stored signal content and the associated signal length. The processor may determine if the signal content and the signal length match the stored content and the stored associated length, and may select the corresponding communications protocol if a match is determined.

In another general aspect, communicating on a bus may include monitoring signals transmitted on the bus, determining that two or more monitored signals have a relationship, selecting a communications protocol that corresponds to the relationship, and processing signals according to the selected communications protocol. The relationship may be that two or more monitored signals form a sequence that is specific to a communications protocol. In addition, two or more monitored signals may be determined to have a relationship if the sequence formed by the two or more monitored signals matches a specific sequence of signals that corresponds to a communications protocol.

A specific sequence that corresponds to a communications protocol may be stored. Two or more monitored signals may be determined to have a relationship if the sequence of the two or more signals matches the stored specific sequence.

A multi-protocol device, including an industrial control device, implementing the method may include a bus interface operable to monitor signals and a processor operable to determine that two or more monitored signals have a relationship and to select a communications protocol that corresponds to the relationship. Signals may be processed by the device according to the selected communications protocol. The relationship may that two or more signals form a sequence that is specific to a communications protocol. The processor may determine that two or more monitored signals have a relationship if the sequence formed by the two or more monitored signals matches a sequence of signals that is specific to a communications protocol.

The device may include a memory that stores a sequence of signals that is specific to a communications protocol. The processor may determine that a sequence formed by the two or more monitored signal matches the stored specific sequence and may select the communications protocol if a match is determined.

In another general aspect, a method for communicating on a bus using a first communications protocol or a second communications protocol may include selecting the first communications protocol, determining checksums associated with a number of signals transmitted on the bus, determining any errors using the checksums, comparing the number of determined errors to a threshold, selecting the second communications protocol if the threshold is exceeded, and processing signals transmitted to the bus and signals received from the bus according to the selected communications protocol. Signals may be processed according to the first communications protocol if the threshold is not exceeded.

A device for communicating on a bus using a first communications protocol or a second communications protocol may include a bus interface to receive signals, and a processor to select the first communications protocol, to determine checksums associated with the received signals, and to determine any errors using the checksums. The number of determined errors may be compared to a threshold. The second communications protocol may be selected if the threshold is exceeded. The processor may process a data signal transmitted or received on the bus according the first communications protocol if the threshold in not exceeded.

In another general aspect, a method for communicating on a bus may include monitoring signals transmitted on the bus, determining a percentage of a type signal, comparing the percentage to a threshold associated with the type of signal, determining if the threshold is exceeded, selecting a communications protocol that corresponds to the type of signal if the threshold is exceeded, and processing signals according to the selected communications protocol.

Other features and advantages will be apparent from the description, the drawings, and the claims.

DESCRIPTION OF DRAWINGS

Like reference symbols in the various drawings indicate like elements.

DETAILED DESCRIPTION

System Overview

Figure 1:
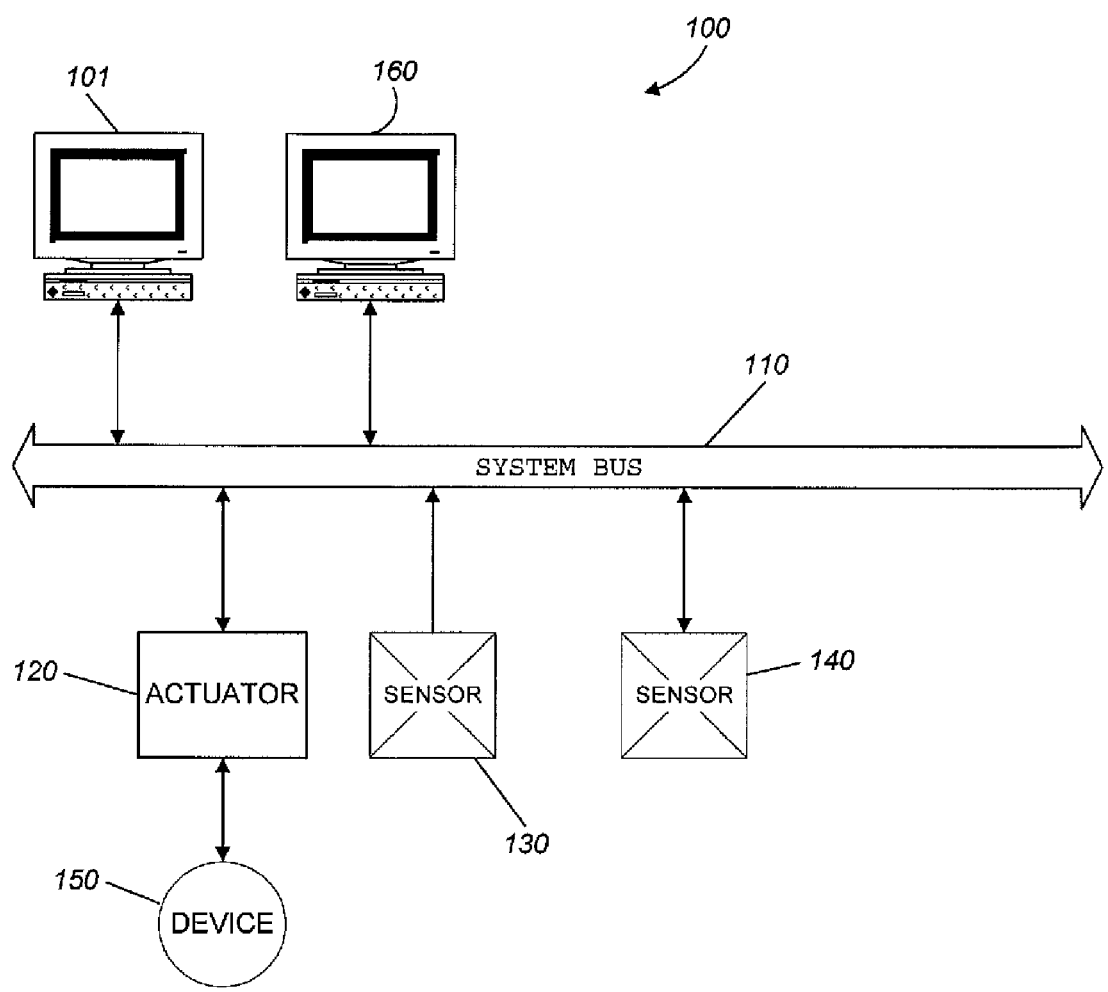
FIG. 1 is an exemplary block diagram of an automated bus system.

As shown in FIG. 1, an exemplary automated system 100 includes a master unit 101 or controller that supervises one or more devices connected to a system bus 110. The devices may include, for example, an actuator 120, a sensor 130, and a sensor 140. The actuator may operate a device 150. The sensors may, for example, monitor processes, equipment, or facility conditions. Devices may be added to and removed from the system bus 110 as needed. The communications between the master unit 101 and the devices may be based on a client server model. The communications between devices may be based on peer-to-peer communication techniques or any other known communication technique.

The system 100 may be used, for example, in an automated manufacturing process. According to this example, the actuator 120 may operate a valve (e.g., device 150) that regulates the flow of a material through a pipe (not shown). The sensor 130 may measure temperature of the material in the pipe, and the sensor 140 may measure the pressure in the pipe. In addition, the actuator 120 may contain one or more sensors, such as, for example, a flow meter that measures the flow of material in the pipe.

Each device (e.g., the actuator 120, the sensor 130, and the sensor 140, as well as other industrial control devices) connected to the system bus 110 may be assigned a specific address. During system initialization, the master unit 101 may send messages to system addresses to determine if a device is located at an address. Thereafter, the master unit 101 sends messages to and receives messages from the devices that have been detected as connected to the system bus 110. Alternatively, a device may send a message to the master unit 101 to signal that the device is connected to the system bus 110.

The master unit 101 may communicate with each device by sending on the system bus 110 signal addressed to the device and by receiving on the system bus 110 signals from the devices addressed to the master unit 101. For example, the master unit 101 may send a message addressed to sensor 130 to determine a condition, such as, for example, the temperature of the material in the pipe. The sensor 130 may reply with a message (e.g., the temperature is 150° C.). addressed to the master unit 101 in response to the master unit's query. Based on the received message, the master unit 101 may send an instruction addressed to the actuator 120 to operate a valve (e.g., to regulate the flow of material in the pipe).

In some communications protocols, the actuator 120 or sensor 130 may be configured to send signals automatically to the master unit 101. For example, a sensor may send a message based on a sensed condition (e.g., the sensor 130 may be programmed to send a message indicating the temperature of the material in the pipe is too hot) or a periodic message based on a time interval (e.g., the sensor 130 may be programmed to send a temperature reading every 30 seconds).

The master unit 101 also may send synchronization messages to each of the devices connected to the system bus 110. The synchronization messages provide timing information to each of the devices so as to allow the devices to synchronize their clocks to a system clock provided by the master unit 101. In addition, a system device, for example, an actuator, may be programmed to act as a master unit.

One or more additional master units 160 may be connected to the system bus 110 to provide redundancy if the master unit 101 fails. An additional master unit 160 may have the same functionality as the master unit 101. The additional master unit 160 may monitor communications on the system bus 110 and may take control of the system bus 110 and communications with any of the devices connected to the system bus 110 if the master unit 101 ceases proper functioning.

Process Devices

Figure 2:
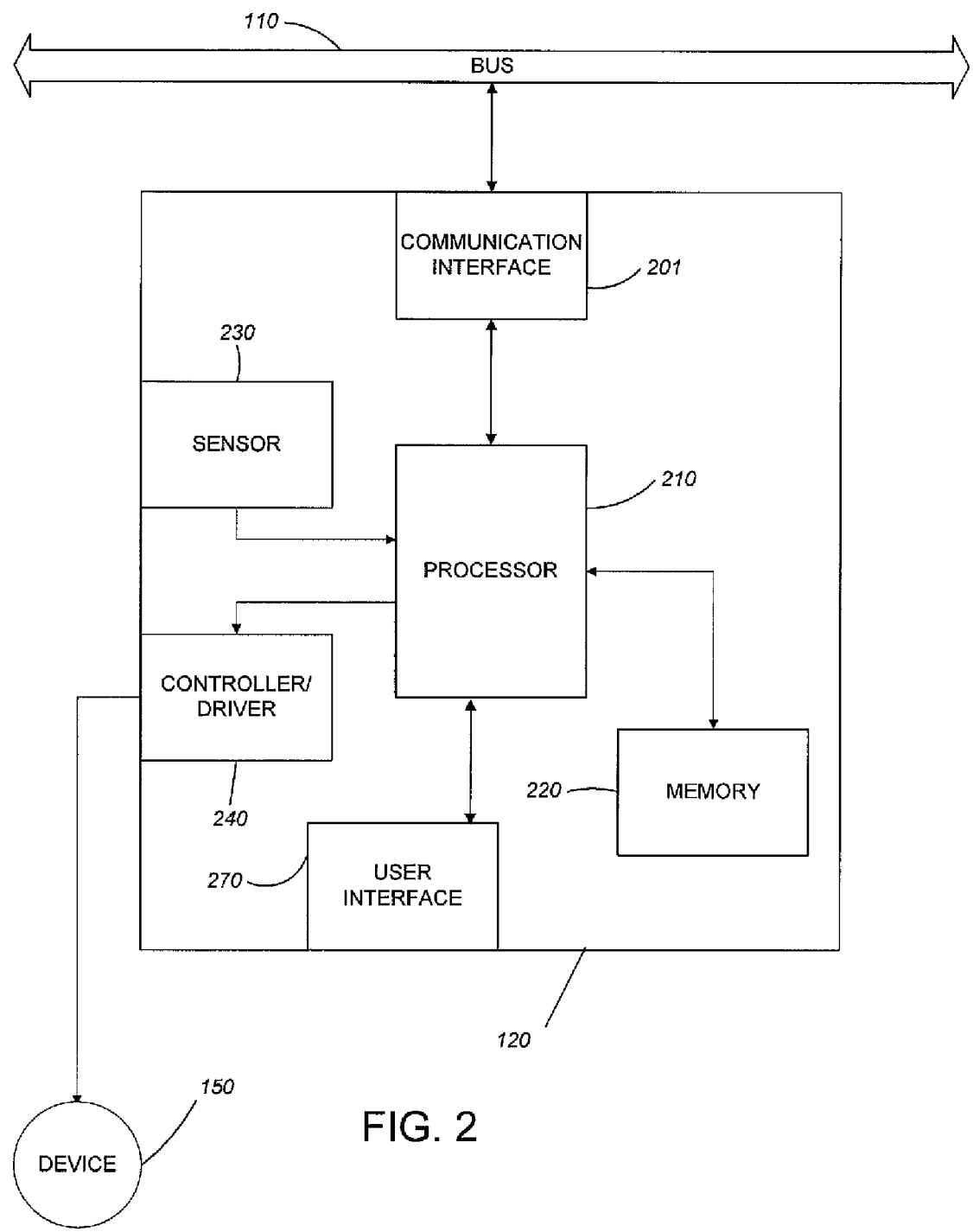
FIG. 2 is an exemplary device for use with the system of FIG. 1.

FIG. 2 shows an exemplary actuator 120 connected to the system bus 110. The actuator 120 receives signals, such as, for example, messages encoded according to a specific communications protocol from the system bus 110 at a communications interface 201. A processor 210 decodes data signals received at the communications interface 201 according to a communications protocol. The processor 210 may be implemented using, for example, a microprocessor, a micro controller, a digital signal processor (DSP), or an application specific integrated circuit (ASIC).

The actuator 120 may include a memory 220. The memory 220 may be implemented using any number of memory devices, such as, for example, a random access memory or a non-volatile memory (e.g., an EPROM, an EEPROM, or a flash memory). The memory 220 may store data collected by the actuator 120 (e.g., from a sensor or from the master unit 101) in addition to software used by the processor 210.

The actuator 120 may include a sensor 230. The processor 210 may read data from the sensor 230, such as, for example, conditions of a device 150 controlled by the actuator 120. The sensor data may be processed by processor 210, stored in the memory 220, and/or transmitted to the master unit 101.

The actuator 120 also may include one or more controller/drivers 240. The driver 240 may receive signals (e.g., a command to open or to close a valve) from the processor 210 to operate a device 150 under control of the actuator 120.

The actuator 120 also may include a user interface 270. The user interface 270 may communicate with the processor 210. The user interface 270 may be used to input instructions to the processor 210 or to download programming or data to the memory 220. The user interface 270 may include a light emitting diode (LED) display and an input device (e.g., a key pad). A user may use the interface 270 to check error conditions of the actuator 120, to select a communication protocol for the actuator 120, to perform diagnostics, and to program the actuator 120.

Sensors 130, 140 may be implemented using a design similar to the actuator 120. Each of sensors 130, 140 may include a measuring/monitoring device programmed to monitor conditions in an automated process. The sensors 130, 140 also may include one or more of a communications interface connected to the system bus 110, a processor, and a memory.

The Open Systems Interconnection (OSI) Model

Figure 3:
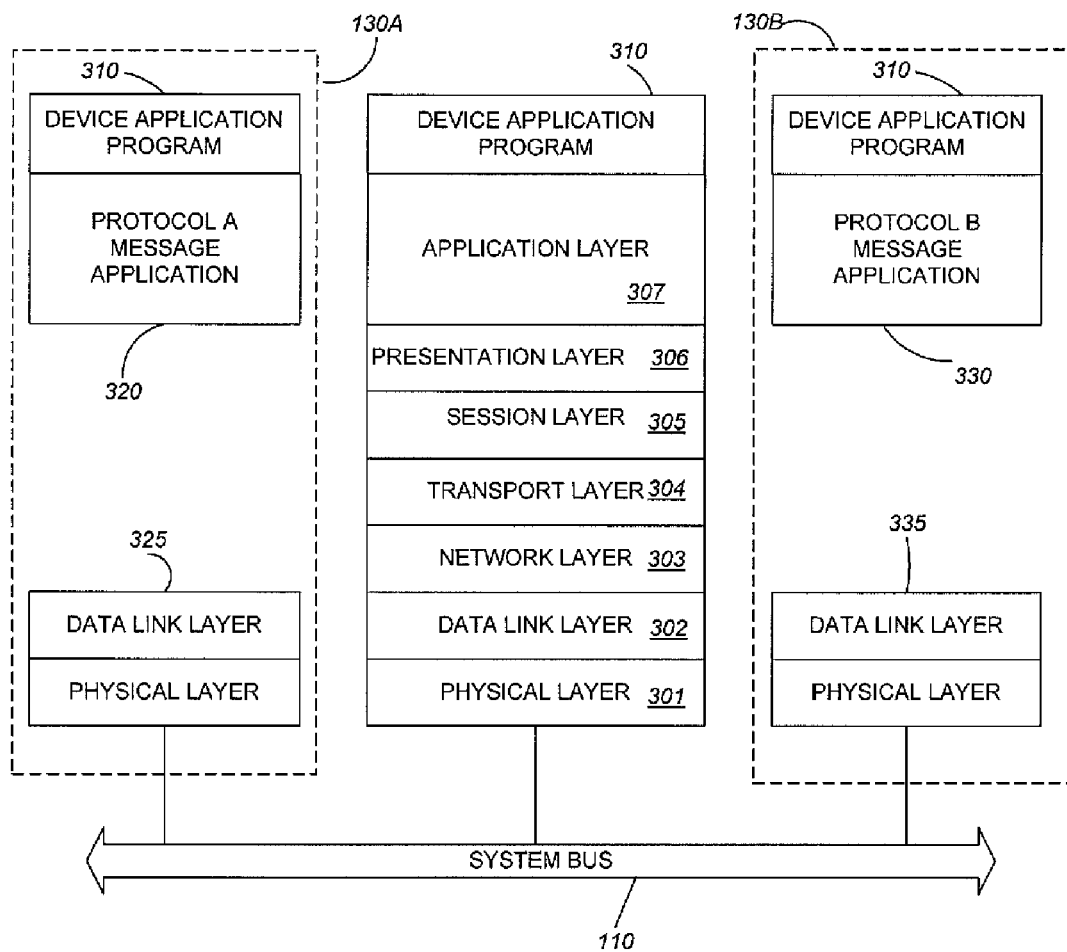
FIG. 3 is an example of two specific communications protocols and their relation to the international organization for standardization (ISO) model.

The OSI model was designed to establish a standard for communications to eliminate problems associated with exchanging signals between devices of different manufacturers. Turning to FIG. 3, the OSI model includes seven communications layers: the physical layer 301, the data link layer 302, the network layer 303, the transport layer 304, the session layer 305, the presentation layer 306, and the application layer 307. Each layer is responsible for exchanging data with the layer's immediate neighbors. However, even though the OSI model is widely used to standardize communications, communications protocols used by different device manufacturers and automated systems are typically incompatible. As a result, when installing an automated system, each device that is connected to the system bus 110 must be able understand the system's communications protocol to communicate with other devices connected to the system. The system bus 110 also may include a point-to-point or a multipoint input/output connection.

Typically, the system 100 uses a specific communications protocol (such as one of the communication protocols associated with FOUNDATION™ Fieldbus, Profibus™, Fox-Com™, or HART™ devices) to encode signals transmitted on the system bus 110. Each device connected to the system bus 110 must use the same communications protocol to communicate with a master unit 101 or any other device connected to the bus (for example an input/output module). Therefore, the communications protocol must be considered when selecting devices to be connected to the system bus 110. In addition, for each type of device (e.g., master unit, sensor, actuator), the supplier must stock separate individual devices for each communications protocol, which results in increased overhead for the supplier. In addition, a device (e.g., sensor 130) may not be switched between systems unless both systems use the same communications protocol.

In the exemplary system 100, only three layers of the OSI model are mapped to the communications protocols shown in FIG. 3: the physical layer 301, the data link layer 302, and the application layer 307. Other layers may be used according to the specifications of a device and the overall communications protocol of the system.

A device application program 310 is run by a processor 210 of a device and helps perform various device functions, such as, for example, monitoring temperature. The device application program 310 is not part of the communications protocol. The device application program 310 may generate data (e.g., temperature data) that are stored in the device memory or sent to another device (e.g., the master unit 101).

Data generated by the device application program 310 that are to be transmitted on the system bus 110 are encoded according to a message application layer (i.e., application layer 307) that is specific to the communications protocol used by the device. Once encoded by the message application layer 307, the signal is encoded according to the data link layer 302. Finally, the signal is encoded for transmission according to the physical layer 301 that supports the transmission medium used for the system's communications (e.g., the system bus 110). Likewise, signals received by the device are received by the physical layer 301, and then unpacked and decoded by the data link layer 302 and the message application layer 307. Data units extracted from the signal by the message application layer 307 are passed to the device application program 310.

Two devices 130A and 130B are shown in FIG. 3. The device 130A and 130B may be of the same type. For example, each device may be a sensing device running a device application 310. However, device 130A encodes application program data for transmitting on the system bus 110 according to a first message application 320 and a first data link layer 325, while device 130B encodes application program data according to a second message application 330 and data link layer 335. As a result, data encoded by device 130A may not be decoded by a device 130B because a signal encoded by device 130A may not be intelligible to the data link layer 335 and the message application layer 330 of device 130B. Likewise, data encoded by device 130B may not be decoded by device 130A.

Figure 4:
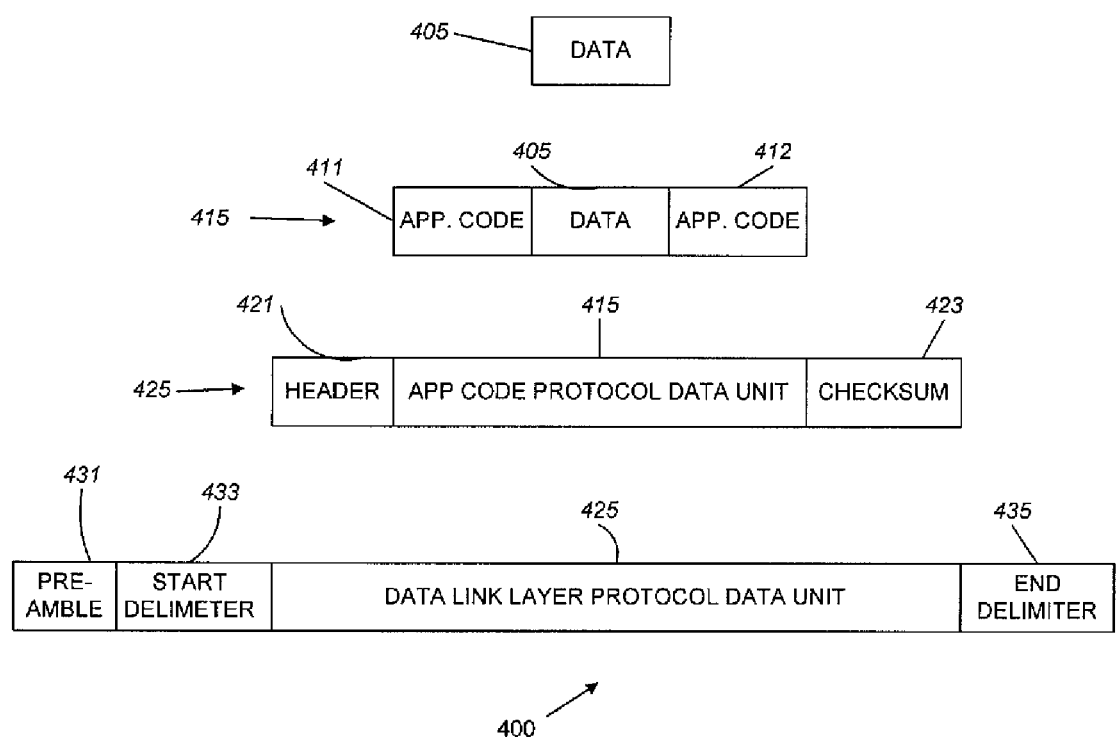
FIG. 4 is an exemplary illustration of the creation of a message for use in a bus system.

Turning to FIG. 4, an exemplary signal 400 illustrates how the communications protocol assembles a signal for transmission on a system bus 110. The device application data 405 (e.g., a temperature) is encoded by the message application layer 307 by adding message application protocol control information (e.g., application codes 411 and 412) to form an application protocol data unit 415. The application data unit 415 is encoded by the data link layer 302 that is compatible with the message applications program layer 307 and the physical layer 301 by adding data link protocol control information 421 and a checksum 423 to create a data link layer protocol data unit 425. The data link layer protocol data unit 425 is encoded by the physical layer 301 for transmission on the system bus 110 by taking the data link layer protocol data unit 425 and adding, for example, a preamble 431, a start delimiter 433, and an end delimiter 435. The device application data 405 included in the signal 400 may be transmitted on the system bus 110 to another device, such as, for example, the master unit 101.

When the device application data 405 is received by another device (e.g., the master unit 101), the process is reversed by decoding the protocol data units until the encoded application data 405 (e.g., a temperature) is retrieved. The decoded application data 405 may be used according to the programming of the system 100.

Communications Protocol Detection

Each signal that is transmitted on the system bus 110 is encoded according to a specific communications protocol as described in the previous section. Once the signal is encoded according to the communications protocol, the signal may be decoded using only the same communications protocol. Therefore, signals from devices with different communications protocols are not compatible. However, if the physical layer 301 (e.g., the system bus 110) is shared by two communications protocols, signals transmitted by a device according to a first communications protocol may be received and partially decoded by a device using another communications protocol as long as the devices share the same physical layer. As a result, all devices that may be connected to a system bus 110 may at least receive signals transmitted on the system bus 110, even if they cannot completely decode the signals to obtain the application data in the signal.

Generally, a device, such as, for example, an actuator 120, has a communications interface 201 connected to the system bus 110. The communication interface 201 may be used to send, receive, and monitor signals on the system bus 110 as long as the communications interface 201 supports the physical layer associated with the system bus 110. The processor 210 may examine signals sent on the system bus 110 according to a set of rules or programming of the processor 210. By examining the signals, the processor 210 may determine or identify which communications protocol (of the communications protocols known to the processor 210) was used to encode the signals on system bus 110. The communications protocol may be determined by any of a number of different processes described in detail below. After determining which communications protocol is being used, the processor 210 may select the communications protocol (e.g., from a number of communications protocols stored in the device's memory) to encode signals sent on the system bus 110 or to decode signals received from the system bus 110.

For example, the communications protocols FOUNDATION™ Fieldbus and Profibus™ share the same physical layer (i.e., a digital, serial, two-way communications bus running at 31.25 kbit/s as defined by approved standards from the International Electrotechinical Commission (IEC 61158-2 1993)) and the International Society for Measurement and Control (ISA-S50.02-1992). Each communications protocol (FOUNDATION™ Fieldbus and Profibus™ ) has signals transmitted on the system bus 110 that are specific to the communications protocol. The processor 210 may monitor signals transmitted on system bus 110 to identify the specific signals. Once a specific signal is identified, the processor 210 may determine the communications protocol to which the specific signal belongs. Since only one communications protocol is used on the system bus 110, the processor 210 may select that communications protocol to encode and decode signals.

One way to identify specific signals is to use the signal content in combination with the signal length. Although content of some signals may be common to both communications protocols, the combination of signal content and signal length generally is specific to a communications protocol. For example, the command signal to return a token in FOUNDATION™ Fieldbus is a one-byte message "34." Although Profibus™ (operating under a different protocol) may send a signal representing a value of 34, the signal would be more than one byte long. In contrast, the message "34" having a length of one byte is specific to the FOUNDATION™ Fieldbus communications protocol. Therefore, when the processor 210 identifies such a message signal, the processor 210 may select FOUNDATION™ Fieldbus for communications on the system bus 110. In addition, because the pass token command is frequently issued on the system bus 110, the processor 210 may quickly determine which communications protocol is being used.

The Profibus™ communications protocol has five constant bytes, for example, that are used as start delimiters 433 for signal 400. For example, the start delimiter SDI has a fixed value of 0×10, the start delimiter SD2 has a fixed value of 0×68, the start delimiter SD3 has a fixed value of 0×A2, the start delimiter SD4 has a fixed value of 0×DC, and the start delimiter SC has a fixed value or 0×E5. In addition, every signal associated with a start delimiter (except SD2) has a fixed length: the length of SDI is 4 bytes, the length of SD3 is 12 bytes, the length of SD4 is 3 bytes, and the length of SC is one byte. Using the combination of the content for the start delimiter combined with the signal's length results in signals that are specific to Profibus™. As a result, a processor 210 monitoring the system bus 110 that identifies one of these signal combinations may identify the communications protocol used on the system bus 110 as being Profibus™.

Figure 5A:
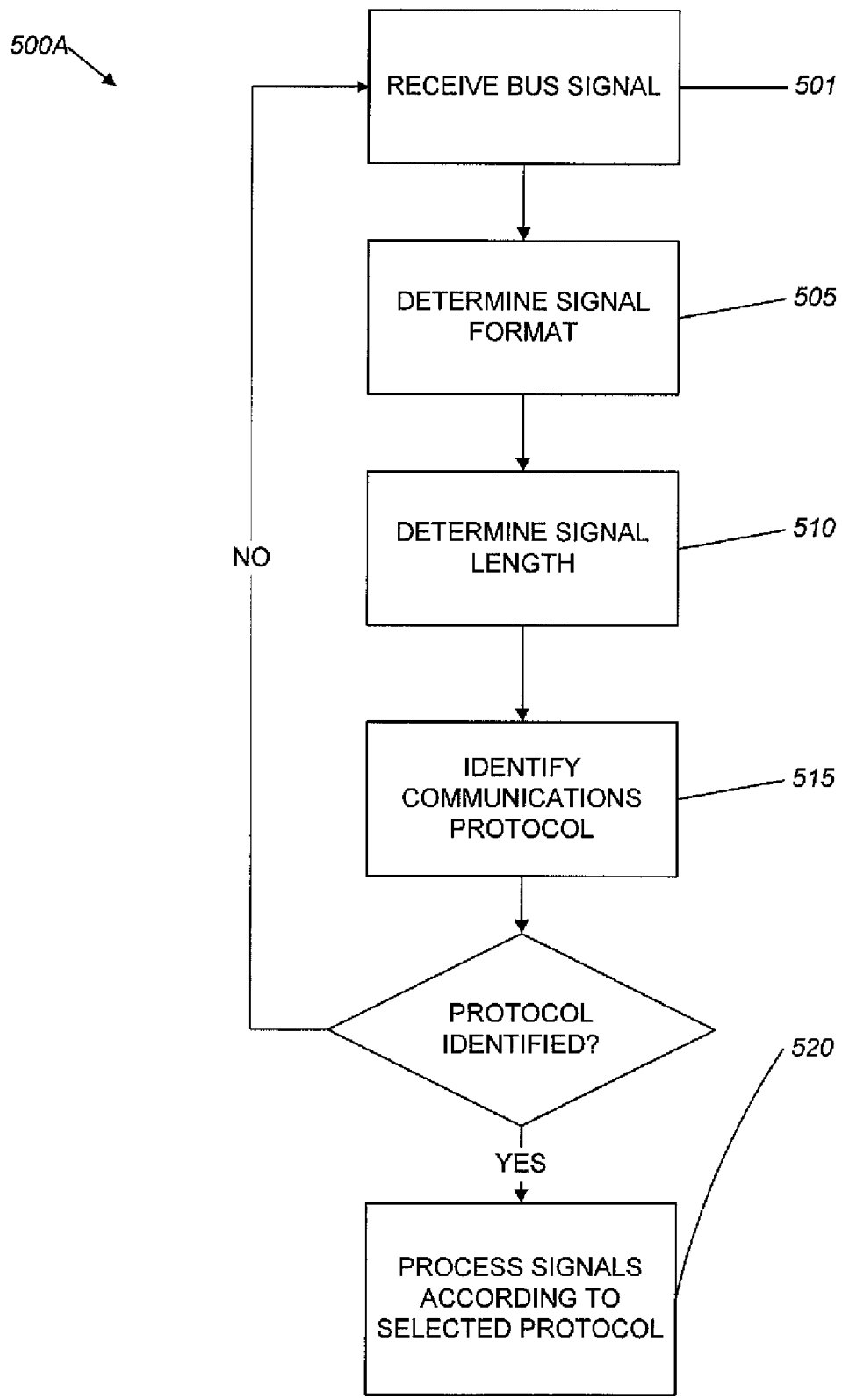
FIGS. 5A-5D are exemplary flow charts of methods for determining a communications protocol on a system bus.

FIG. 5A shows one process 500A for determining the communications protocol according to the approach described above. The device receives a signal from the system bus 110 (step 501). The processor 210 processes the signal to determine the content of the signal (step 505) and the length of the signal (step 510). The processor then compares the signal content and length to a set of signals that are specific to a communications protocol to identify a communications protocol used to send the signal (step 515). If the signal is not identified as specific (step 517), then the processor 210 starts over at step 501 with the next signal received from the system bus 110. If the signal is specific (step 517), the processor 210 selects the communications protocol that corresponds to the specific signal and processes all other signals according to the selected communications protocol (step 520).

Figure 5B:
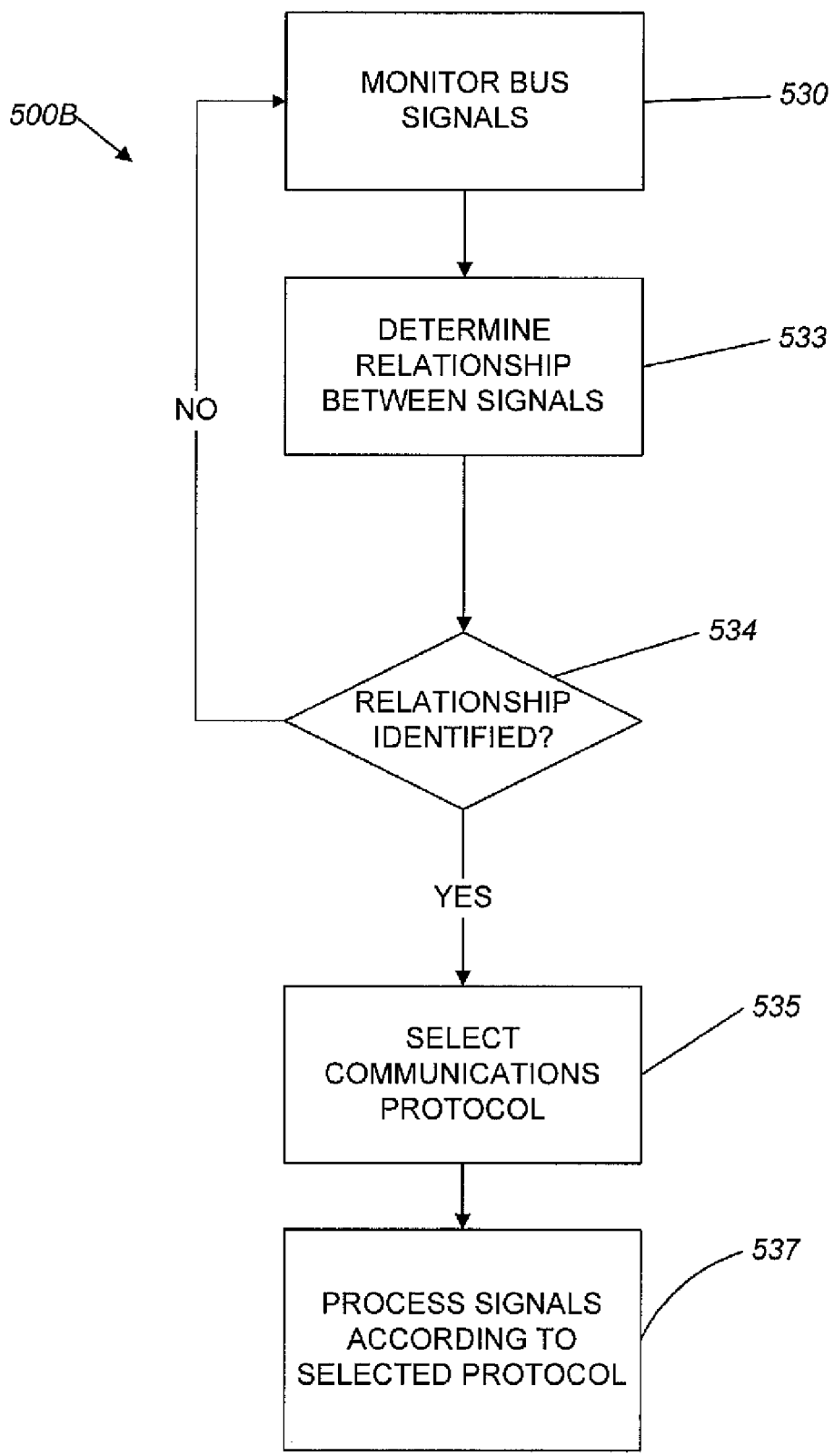

Another way to determine a communications protocol is to identify a relationship between two or more signals. FIG. 5B shows a process 500B that monitors signals transmitted on the system bus 110 (step 530). Using the monitored signals, the processor determines if two or more signals have a relationship that is specific to a communications protocol (step 533). For example, if a signal having a first content is followed or preceded by a signal with a second content, the sequence of signals may be specific to a communications protocol. In FOUNDATION™ Fieldbus, the pass token command "33" is followed by a return token command starting with "34." This sequence of signals is specific to FOUNDATION™ Fieldbus and therefore may be used by the processor 210 to identify a communications protocol from signals transmitted on the system bus 110. If a relationship between signals is identified (step 534), the communications protocol corresponding to the relationship is selected (step 535), and signals are processed according to the selected communications protocol (step 537).

Another relationship between signals that may be used to identify a communications protocol is the ratio of one type of message or signal to another type of message or signal. For example, in FOUNDATION™ Fieldbus ratio of the messages "send token" and "return token" may be monitored; in Profibus™, the ratio of a send or a request data signal to a send or a request data reply signal may be monitored.

Figure 5C:
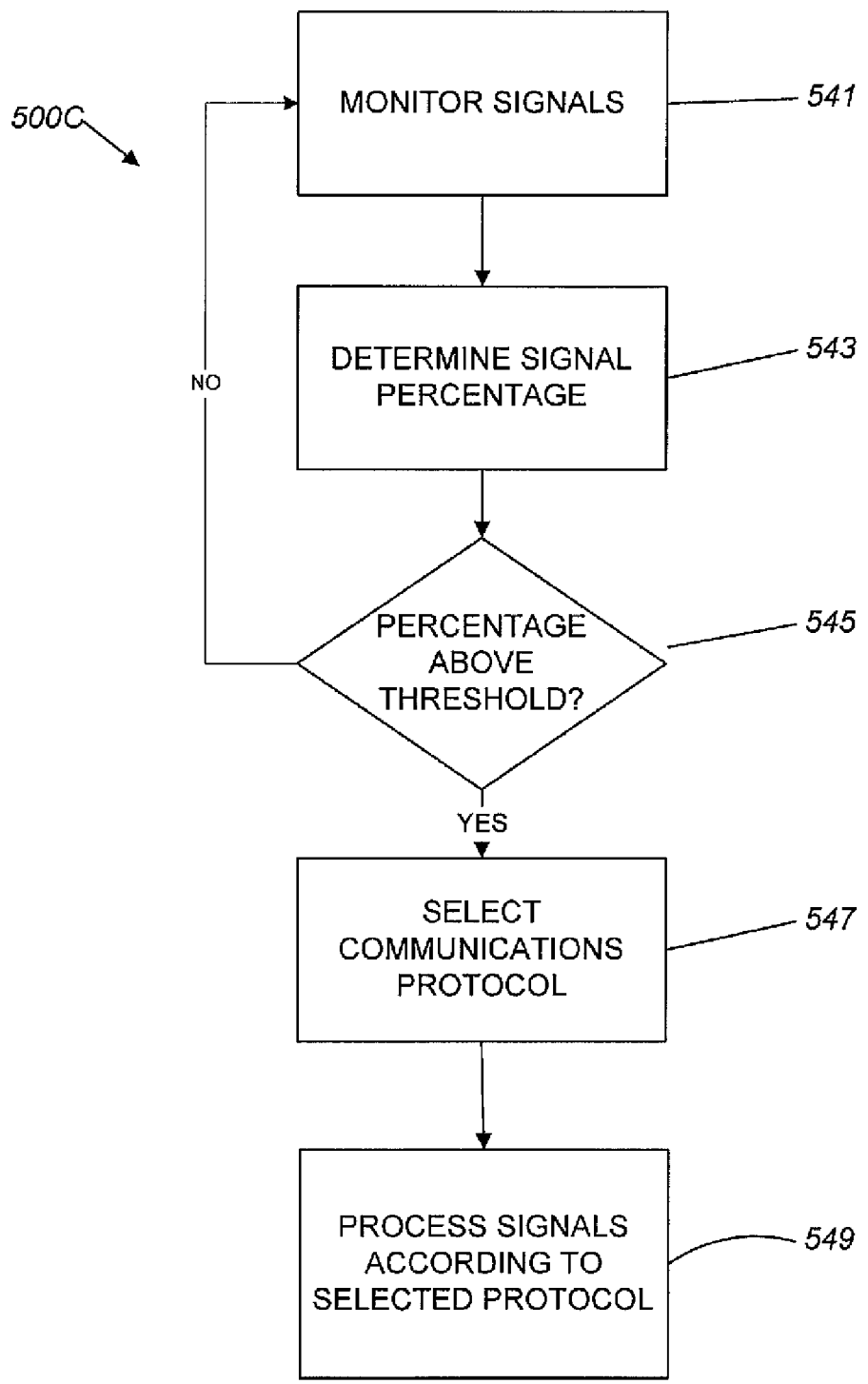

According to yet another general process, certain types of signals (e.g., signals having a particular content) may be sent more frequently in a particular communications protocol. FIG. 5C shows a process 500C that monitors signals transmitted on the system bus 110 (step 541). Process 500C is generally one technique for selecting one or more of the protocols from a set of supported protocols. A processor 210 monitoring signals on the system bus 110 may determine what percentage of signals over a time period are of a certain type (step 543). If the percentage of a specific type of message rises above a threshold (step 545) or alternatively falls within a predetermined range, then the processor 210 determines that the communications protocol associated with the message and frequency is being used to encode signals on the system bus 110. The processor 210 selects the communications protocol (step 547) and processes signals according to the selected communications protocol (step 549). If the percentage of a specific type of message does not rise above a threshold or does not fall within a predetermined range, the processor 210 continues to monitor signals (step 541) until a threshold is exceeded (or the percentage falls within the predetermined range) and a communications protocol is identified.

A table of specific messages, relationships, and frequencies for any communications protocol may be composed using any or all of the approaches described above. Each specific message, relationship, and frequency is assigned a corresponding communications protocol in the table. The table may be stored, for example, as a look-up table (LUT) in the memory 220 of the device 120. The processor 210 may compare signals transmitted on the system bus 110 and/or the signals' properties to the specific messages, relationships, ratios, and frequencies stored in the LUT. When a match is determined, the communications protocol associated with the match may be selected as the communications protocol to be used to transmit and receive messages on the system bus 110. However, the processor 210 also may use other comparisons, algorithms, analysis, or logic based on the above-described method to identify a communication protocol used to send a signal. For example, fuzzy logic, a boundaries-based approach, or a rules-based approach may be used to determine a communications protocol. In addition, relationships other than a one-to-one correspondence may be used to determine if a signal belongs to a communications protocol.

Figure 5D:
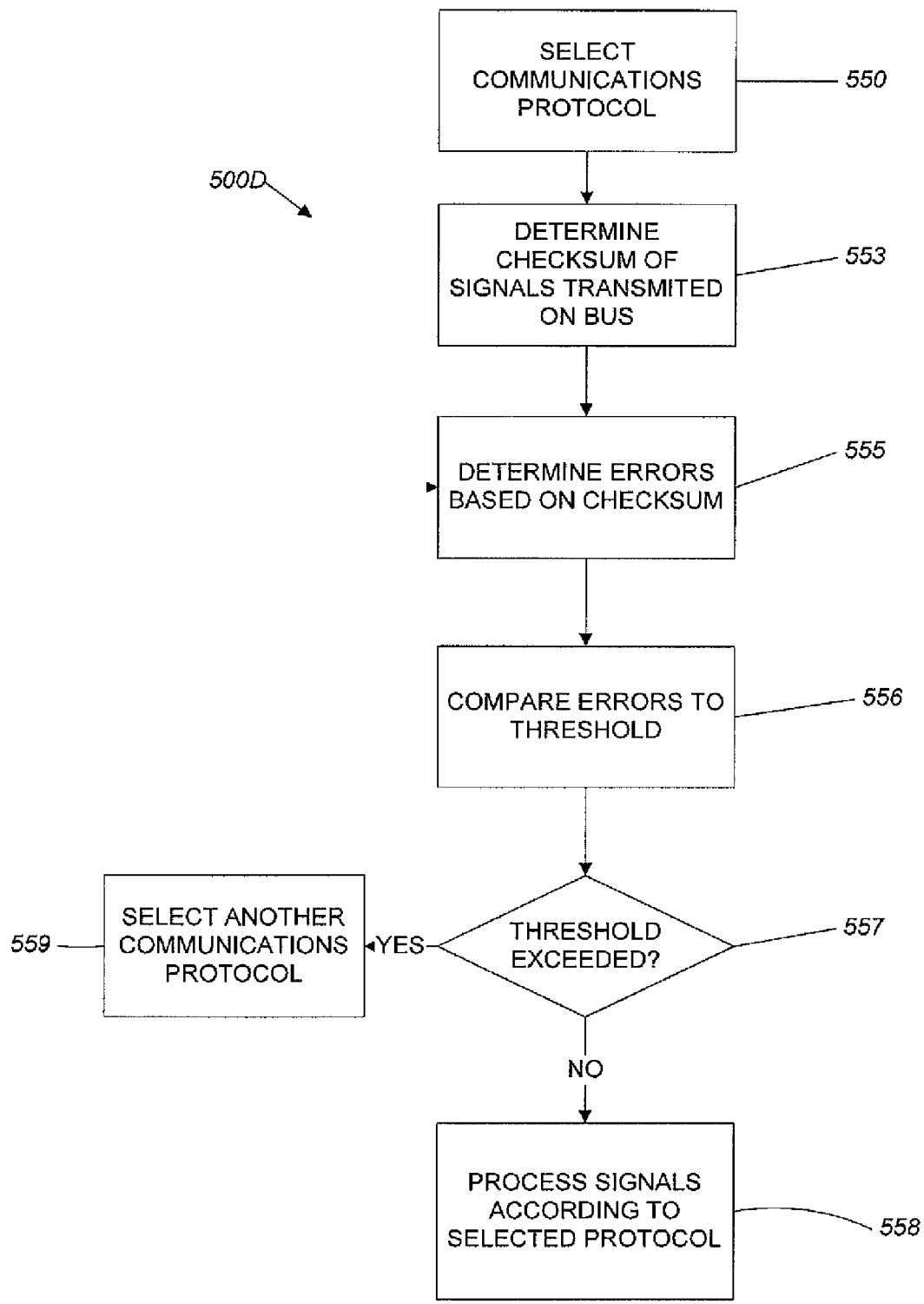

Checksums 423 also may be used to identify a communications protocol. Turning to FIG. 5D, a process 500D controls a processor 210 to select a communications protocol from one of several communications protocols (e.g., stored in the device memory 220) (step 550). Process 500D is generally one technique for rejecting one or more of the protocols from a set of supported protocols. Having selected a communications protocol, the processor 210 attempts to decode signals received on the system bus 110 using the signal's checksum 423 (step 553). The processor 210 may determine if any errors are caused by decoding the signal using the checksum 423 (step 555). If the wrong communications protocol is selected, then decoding the signal using the checksum will generate a large number of errors. After decoding one or more signals, the processor 210 may compare the errors to a threshold (step 556) and determine if an error rate is above a threshold (step 557). If the error rate is above the threshold, the processor 210 determines that the wrong communications protocol has been selected and selects one of the remaining communications protocols to try (step 559). If the processor 210 determines that the error rate is below the threshold, the processor 210 assumes that the proper communications protocol has been selected and processes the signal according to the communications protocol (step 558).

Aspects of the physical layer itself may also be used to identify the communications protocol being used. For example, the clock or timing of signals sent on the transmission medium (e.g., the system bus 110) may be specific to the communications protocol. The processor 210 may monitor the timing associated with signal transmitted on the system bus 110 to determine which communications protocol is associated with the timing. In addition, the transmission baud rates for a message may be monitored. For example, baud rates of 600 or 4800 may indicate the FOXCom™ protocol and baud rates of 1200 may indicate the HART™ protocol.

Any one of these above-described approaches may be used to determine or verify which communications protocol is running on a system bus 110. In addition, two or more of these approaches may be combined to determine or verify a communications protocol. For example, a processor 210 may monitor for both specific signals and specific relationships. In addition, if one method is unable to identify a communications protocol another method may be used to attempt to determine a communications protocol. For example, for FIGS. 5A-5C, if the answer to the decision blocks, 517, 534, or 545 is no, then another method may used to identify the communications protocol instead of returning to monitor signals.

Some communications protocols require a device to begin interacting with the system immediately. Therefore, a device could select a communications protocol (e.g., based on statistical percentages, the last communications protocol selected, or a factory default) and begin communications. However, after selecting a communications protocol the processor 210 may use one or more of the approaches described above to determine if the correct communications protocol has been selected. If the wrong communications protocol was selected, the correct communications protocol can be identified and selected.

Protocol Initialization

Figure 6:
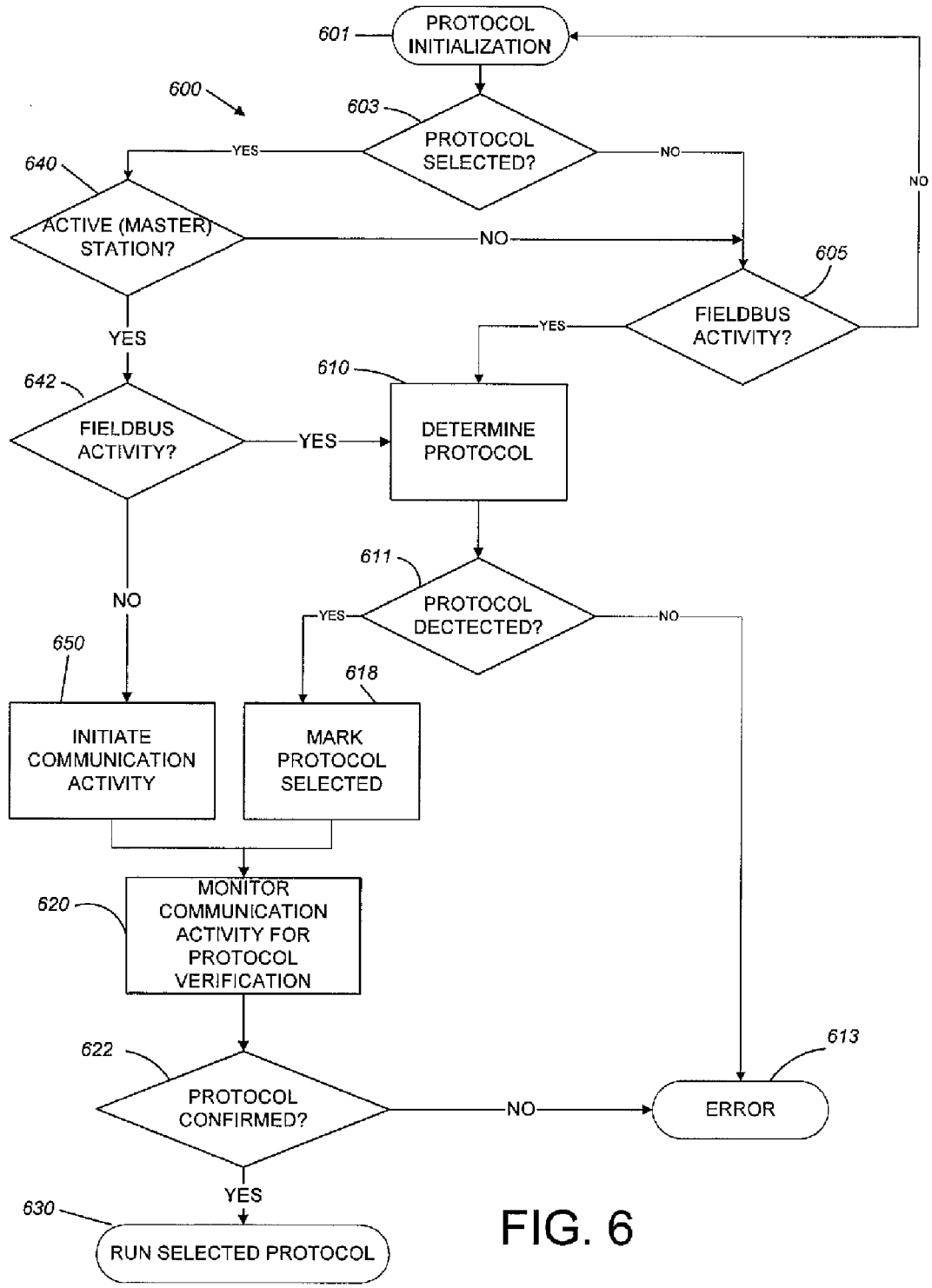
FIG. 6 is an exemplary flowchart associated with communications protocol selection of a device for use with the system of FIG. 1.

FIG. 6 shows an exemplary method 600 that may be used to initialize a device for a particular communications protocol when the device (e.g., a sensor, an actuator, or a master unit) is connected to a system bus 110. The same method 600 can be performed when the device is disconnected from the system bus 110, when any of the components within the device 120 lose power, or when the system bus 110 loses power. The processor 210 begins a communications protocol initialization (step 601), for example, when the device is first powered up, or after being reset. The processor 210 determines if a communications protocol has been selected (step 603). The communications protocol may have been previously selected a number of ways. For example, the device may have been configured according to a communications protocol during manufacturing, testing, or by a supplier or user before installation. The device also may have been previously initialized to according to a communications protocol (and therefore selected a communications protocol as described below). In addition, the device may have been configured using the user interface 270, a switch (not shown), or a configuration tool.

If a communications protocol was not selected, then the processor 210 determines whether there is any system bus activity (step 605). If there is no system bus activity, the device waits until there is activity on the system bus 110. When activity on the system bus 110 is detected, the processor 210 determines which communications protocol is being used on the system bus 110 (step 610) using one or more of the processes described in the previous section. After a period of time, a determination is made as to whether the processor 210 has been able to detect the communications protocol that is used on system bus 110 (step 611). If the processor 210 is unable to determine which communications protocol is being used, an error condition is generated to produce an indication that the device is not working (e.g., to light an LED on the device or display a message on the user interface) (step 613).

Once the communications protocol is determined, the processor 210 stores an indication of the selected communications protocol in the memory 230, and marks the determined communications protocol as selected (step 618). The processor 210 then monitors communication activity on the system bus 110, and verifies that the correct communications protocol has been selected (step 620) using one or more of the processes described in the previous section. The processor 210 determines if the communications protocol has been confirmed (622). If the communications protocol cannot be confirmed, an error condition is generated (step 613). If the communications protocol is confirmed, the processor 210 runs the selected communications protocol (step 630) for all signals received from the system bus 110.

If it is determined that the communications protocol was selected (step 603), the processor 210 determines whether the device operates as a master unit (step 640). If the device is not a master unit, the processor 210 determines whether there is activity on the system bus 110 and proceeds as described above for step 605.

If the device is a master unit, the processor 210 determines whether there is any activity on the bus (step 642). If there is activity, then the processor 210 determines the communications protocol as described above for step 610. If there is no field bus activity, the processor 210 initiates communication activity as the master unit (step 650). The processor 210 then monitors and verifies that the correct communications protocol was selected as described above for step 620.

The initialization process 600 may be modified in a number of ways. For example, the verification steps may be omitted and the selected communications protocol may be initiated. If an error condition occurs, the process 600 may be restarted.

A number of exemplary implementations have been described. Nevertheless, it will be understood that various modifications may be made. For example, advantageous results still could be achieved if the steps of the disclosed techniques were performed in different order and/or if components in a disclosed system were combined in a different manner and/or replaced or supplemented by other components. Accordingly, other implementations are within the scope of the following claims.

What is claimed is:

1. A method comprising:
monitoring a bus for encoded messages sent between two or more devices connected to the bus;
detecting at least two encoded messages on the bus, a first one of the encoded messages including a first start delimiter, a first data unit, and a first end delimiter and a second one of the encoded messages including a second start delimiter, a second data unit, and a second end delimiter;
determining whether first content in the first data unit and second content in the second data unit have a relationship that is specific to a particular communications protocol, from among multiple communications protocols;
if the determination indicates that the first content and second content have the relationship specific to the particular communications protocol, selecting the particular communications protocol, from among the multiple communications protocols, that corresponds to the relationship; and
processing encoded messages on the bus according to the selected communications protocol.

2. The method of claim 1 wherein the relationship is that the first content and the second content form a sequence that is specific to the particular communications protocol.

3. The method of claim 2 wherein determining whether the first content and the second content have a relationship includes determining a ratio of the first content and the second content.

4. The method of claim 1 further comprising storing a specific sequence of content that corresponds to the particular communications protocol, wherein determining whether the first content and the second content have a relationship includes determining if a sequence of the first content and the second content matches the stored specific sequence.

5. The method of claim 1 wherein the two or more devices on the bus comprise two or more industrial process control devices, the industrial process control devices configured to implement an industrial process.

6. The method of claim 5 wherein at least one of the industrial process control devices comprises an actuator.

7. The method of claim 5 wherein at least one of the industrial process control devices comprises a sensor configured to sense a condition of a material involved in the industrial process.

8. The method of claim 7 wherein the condition is a temperature or pressure of the material in a pipe.

9. A device comprising:
a bus interface configured to monitor a bus for encoded messages sent between two or more devices connected to the bus and to detect at least two encoded messages on the bus, a first one of the encoded messages including a first start delimiter, a first data unit, and a first end delimiter and a second one of the encoded messages including a second start delimiter, a second data unit, and a second end delimiter; and
a processor coupled to the bus interface and configured to:
determine whether first content in the first data unit and second content in the second data unit have a relationship that is specific to a particular communications protocol, from among multiple communications protocols;
if the determination indicates that the first content and second content have the relationship specific to the particular communications protocol, select the particular communications protocol, from among the multiple communications protocols, that corresponds to the relationship; and
process encoded messages on the bus according to the selected communications protocol.

10. The device of claim 9 wherein the relationship is that the first content and the second content form a sequence that is specific to the particular communications protocol.

11. The device of claim 9 wherein, to determine whether the first content and the second content have a relationship, the processor is configured to determine a ratio of the first content and the second content.

12. The device of claim 9 further comprising a memory configured to store a specific sequence of messages that corresponds to the particular communications protocol, wherein, to determine whether the first content and the second content have a relationship, the processor is configured to determine if a sequence formed by the first content and the second content matches the stored specific sequence.

13. The device of claim 9 wherein the device is an industrial process control device, the processor being further configured to implement at least a portion of an industrial process.

14. The device of claim 13 further comprising an actuator.

15. The device of claim 13 further comprising a sensor configured to sense a condition of a material involved in the industrial process.

16. The device of claim 15 wherein the condition is a temperature or pressure of the material in a pipe.

* * * * *